(12) United States Patent
Cheng

(10) Patent No.: US 9,924,246 B2
(45) Date of Patent: Mar. 20, 2018

(54) TRANSITION REPLACEMENT FOR CURRENT LEVELING IN A HIGH-SPEED TRANSMITTER

(71) Applicant: Credo Technology Group Limited, Grand Cayman (KY)

(72) Inventor: Lawrence (Chi Fung) Cheng, Hong Kong (HK)

(73) Assignee: Credo Technology Group Limited, Cypress, TX (US)

( * ) Notice: Subject to any disclaimer, the term of this patent is extended or adjusted under 35 U.S.C. 154(b) by 128 days.

(21) Appl. No.: 14/972,830

(22) Filed: Dec. 17, 2015

(65) Prior Publication Data

US 2017/0180833 A1    Jun. 22, 2017

(51) Int. Cl.
*H04B 10/50* (2013.01)
*H04Q 11/00* (2006.01)

(52) U.S. Cl.
CPC ....... *H04Q 11/0005* (2013.01); *H04B 10/501* (2013.01); *H04Q 2011/0039* (2013.01); *H04Q 2011/0045* (2013.01); *H04Q 2011/0049* (2013.01)

(58) Field of Classification Search
CPC .................................................. H04B 10/501
See application file for complete search history.

(56) References Cited

U.S. PATENT DOCUMENTS

| | | | |
|---|---|---|---|
| 7,683,656 B1 * | 3/2010 | Ho | H03K 19/00361 326/21 |
| 9,071,479 B2 | 6/2015 | Qian et al. | |
| 2005/0057280 A1 * | 3/2005 | Groen | H04L 25/0282 326/86 |
| 2008/0218222 A1 * | 9/2008 | Nishi | H04L 25/0286 327/108 |
| 2012/0025800 A1 * | 2/2012 | Dettloff | H04L 25/0272 323/299 |

* cited by examiner

*Primary Examiner* — Nathan Curs
(74) *Attorney, Agent, or Firm* — Ramey & Schwaller, LLP

(57) ABSTRACT

An illustrative driver embodiment supplies an electrical transmit signal to an emitter module in response to an input bit stream. The illustrative driver embodiment includes: a voltage supply node which may be powered via a parasitic series inductance; a transmit signal buffer that drives the electrical transmit signal with current from the voltage supply node, the electrical transmit signal including transitions at bit intervals as dictated by the input bit stream; and an auxiliary signal buffer that supplies an auxiliary signal with current from the voltage supply node to an auxiliary module having an input impedance matched to an input impedance of the emitter module, the auxiliary signal having a transition at every bit interval where the electrical transmit signal lacks a transition.

15 Claims, 5 Drawing Sheets

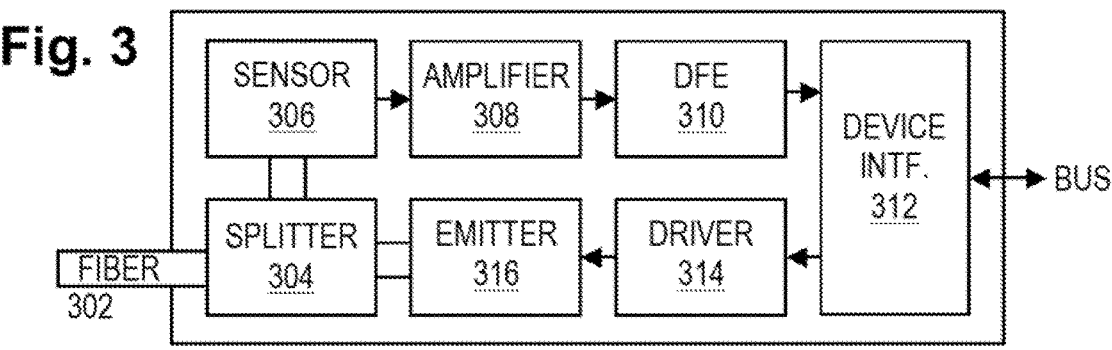
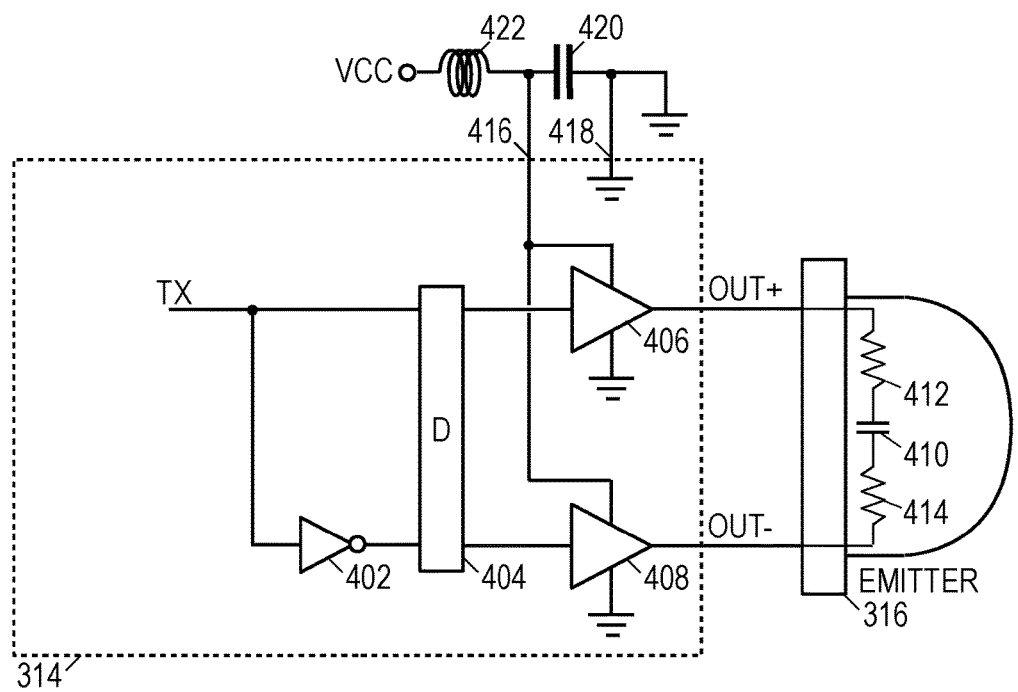

TRANSITION REPLACEMENT FOR CURRENT LEVELING IN A HIGH-SPEED TRANSMITTER

BACKGROUND

As digital data processing technology continues to improve, the need for higher data transmission rates continues to increase. For example, the IEEE 400 Gbit/s optical fiber Ethernet standard (IEEE 802.3bs) provides for 50 Gbit/s signaling on each of multiple lanes. The performance limitations of the physical media and silicon-based transceiver circuits make it extremely challenging to achieve such high signaling rates. The sub-20 picosecond ($<20 \times 10^{-12}$ s) pulse width requires current swings in excess of 100 mA at the input of the light emitter module. If not adequately suppressed, the data-dependent switching noise propagates along the power rails throughout the integrated circuit, introducing timing jitter and degrading the performance for many of the components that are critical for high-speed signaling.

SUMMARY

Rather than relying solely on conventional filtering strategies to address this issue, the present disclosure adopts a current leveling strategy in which the switching noise is made relatively uniform (at least at the pulse-width time scale) and independent of the transmitted data. At least some disclosed embodiments provide an auxiliary drive signal having transitions where the main transmit signal lacks transitions, and lacking such transitions where the main transmit signal does have them. Taken together, the transmit and auxiliary drive signals ensure that transitions occur at a constant rate that, when accounting for the parasitic inductances of a typical integrated circuit, provides a consistent current draw. This current leveling strategy has been found to significantly enhance the performance of a high-speed transmitter.

One illustrative embodiment of a high-speed transmitter includes: an emitter module that converts an electrical transmit signal into an optical transmit signal; an auxiliary module having an input impedance matched to an input impedance of the emitter module; and a driver that supplies the electrical transmit signal to the emitter module and an auxiliary signal to the auxiliary module, the auxiliary signal having a transition at every bit interval where the electrical transmit signal lacks a transition.

One illustrative driver embodiment supplies an electrical transmit signal to an emitter module in response to an input bit stream. The illustrative driver embodiment includes: a voltage supply node; a transmit signal buffer that drives the electrical transmit signal with current from the voltage supply node, the electrical transmit signal including transitions at bit intervals as dictated by the input bit stream; and an auxiliary signal buffer that supplies an auxiliary signal with current from the voltage supply node to an auxiliary module having an input impedance matched to an input impedance of the emitter module, the auxiliary signal having a transition at every bit interval where the electrical transmit signal lacks a transition.

One illustrative embodiment of a high-speed transmission method includes: (a) deriving a serialized transmit stream from an input bit stream; (b) deriving a serialized auxiliary stream from the input bit stream, the serialized auxiliary stream having a transition at every bit interval where the serialized transmit stream lacks a transition; (c) synchronously supplying the serialized transmit stream to a transmit signal buffer and the serialized auxiliary stream to the auxiliary signal buffer; (d) driving an emitter module with an electrical transmit signal from the transmit signal buffer; and (e) driving an auxiliary module with an auxiliary signal from the auxiliary signal buffer, the auxiliary module having an input impedance matched to an input impedance of the emitter module.

Each of the illustrative embodiments above may have any one of the following additional features alone or in any suitable combination: (1) the driver derives the electrical transmit signal and the auxiliary signal from an input bit stream using at least a non-transition detection circuit (2) the non-transition detection circuit is coupled to a toggle circuit that introduces transitions in the auxiliary signal (3) a latch that synchronizes bit intervals in the electrical transmit signal and the auxiliary signal (4) the driver supplies the electrical transmit signal and the auxiliary signal using signal buffers that are powered from a shared voltage supply node having a series inductance (5) the driver supplies the electrical transmit signal using a differential pair of transmit signal buffers and supplies the auxiliary signal using a differential pair of auxiliary signal buffers, each of said differential pairs being powered from a shared voltage supply node having a series inductance (6) the bit interval is less than 40 nanoseconds (7) a non-transition detection circuit that signals a lack of transition between bits in the input bit stream (8) a serialization circuit that derives a serialized transmit stream from the input bit stream, wherein the non-transition detection circuit operates on the serialized transmit stream (9) a toggle circuit coupled to the non-transition detection circuit to generate a serialized auxiliary stream having transitions at every bit interval where the serialized transmit stream lacks a transition (10) a synchronization latch that provides the serialized transmit stream to the transmit signal buffer synchronously with providing the serialized auxiliary stream to the auxiliary signal buffer (11) the transmit signal buffer is part of a differential pair of transmit signal buffers and the auxiliary signal buffer is part of a differential pair of auxiliary signal buffers, each of said differential pairs drawing current from said voltage supply node (12) the method further includes powering the transmit signal buffer and the auxiliary signal buffer from a shared voltage node having a series inductance (13) said deriving the serialized auxiliary stream includes: (A) detecting non-transitions between bit intervals in the serialized transmit stream and (B) toggling the serialized auxiliary stream each time a non-transition is detected.

BRIEF DESCRIPTION OF THE DRAWINGS

In the drawings:

FIG. 3 is a function-block diagram of an illustrative fiber optic interface module.

FIG. 4 is a schematic of an illustrative driver output stage.

Figure 1:
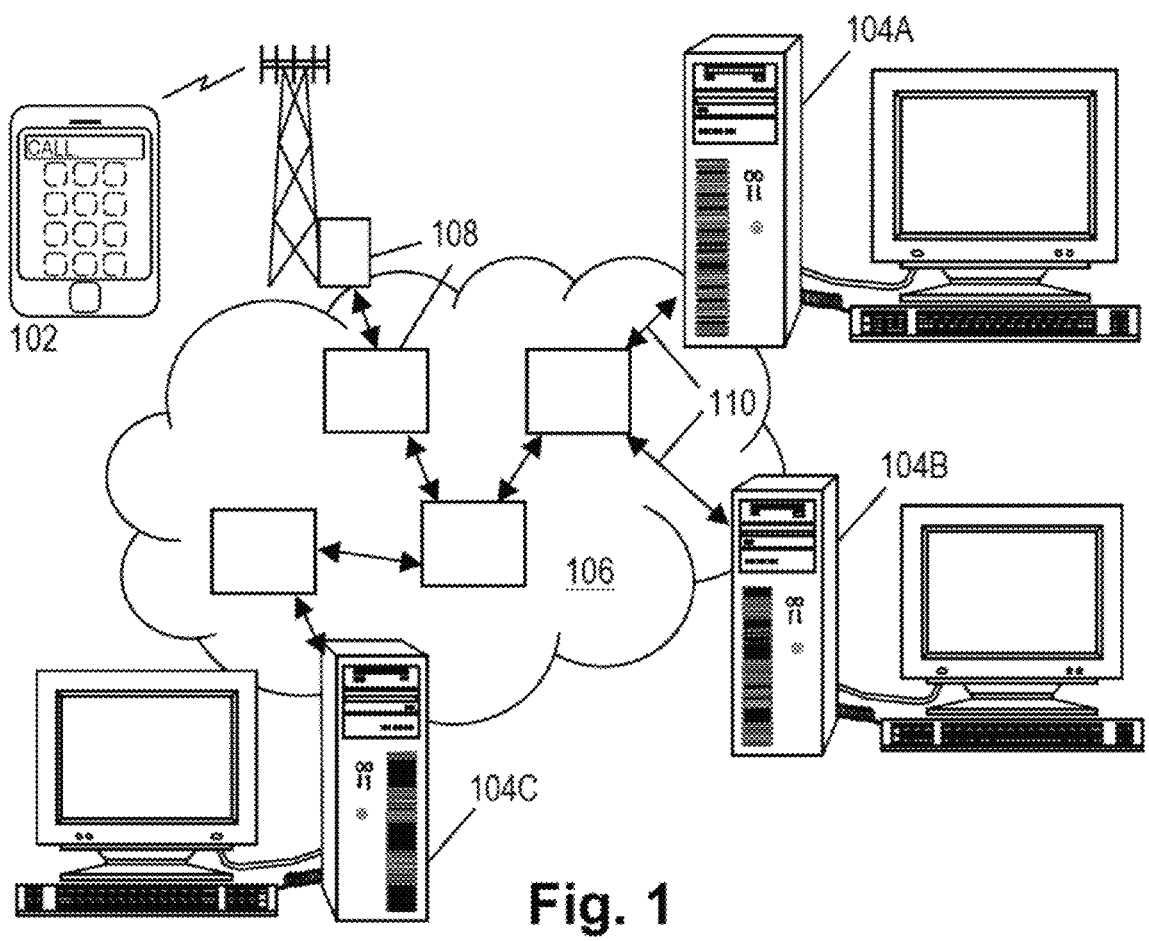
FIG. 1 shows an illustrative computer network.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

The disclosed apparatus and methods are best understood in the context of the larger environments in which they operate. Accordingly, FIG. 1 shows an illustrative communications network including mobile devices 102 and computer systems 104A-C coupled via a routing network 106. The routing network 106 may be or include, for example, the Internet, a wide area network, or a local area network. In FIG. 1, the routing network 106 includes a network of equipment items 108, such as switches, routers, and the like. The equipment items 108 are connected to one another, and to the computer systems 104A-C, via point-to-point communication links 110 that transport data between the various network components.

Figure 2:
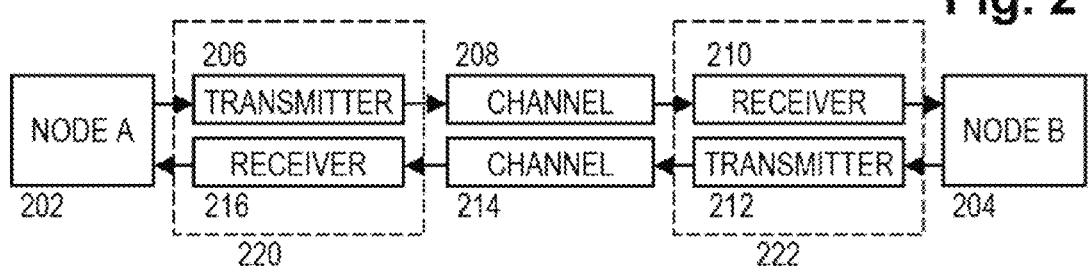
FIG. 2 is a function-block diagram of an illustrative point-to-point communication link.

FIG. 2 is a diagram of an illustrative optical fiber communication link that is representative of links 110 in FIG. 1. The illustrated embodiment includes a first node 202 ("Node A") in communication with a second node 204 ("Node B"). Nodes A & B can each be, for example, any one of mobile devices 102, equipment items 108, computer systems 104A-C, or other sending/receiving devices suitable for high-rate digital data communications.

Coupled to Node A is a transceiver 220, and coupled to Node B is a transceiver 222. Communication channels 208 and 214 extend between the transceivers 220 and 222. The channels 208 and 214 include one or more optical fibers. Bidirectional communication between Node A and Node B can be provided using separate channels 208 and 214, or in some embodiments, a single channel that transports signals in opposing directions without interference.

A transmitter 206 of the transceiver 220 receives data from Node A and transmits the data to the transceiver 222 via a signal on the channel 208. The signal may be an amplitude- or phase-modulated light beam, often characterized as a series of light pulses. A receiver 210 of the transceiver 222 receives the signal via the channel 208, uses the signal to reconstruct the transmitted data, and provides the data to Node B. Similarly, a transmitter 212 of the transceiver 222 receives data from Node B, and transmits the data to the transceiver 220 via a signal on the channel 214. A receiver 216 of the transceiver 220 receives the signal via the channel 214, uses the signal to reconstruct the transmitted data, and provides the data to Node A.

FIG. 3 illustrates an optical transceiver embodiment suitable for bidirectional signaling across a single optical fiber. The optical fiber 302 couples to a splitter 304, which creates two optical paths to the fiber: one for receiving and one for transmitting. A sensor 306 is positioned on the receiving path to convert received optical signals into analog electrical signals that are amplified by amplifier 308 in preparation for demodulation by, e.g., a decision feedback equalizer (DFE) 310. The DFE 310 reconstructs a digital data stream from the received signal. A device interface 312 buffers the received data stream and, in some embodiments, performs error correction and payload extraction to make the transmitted data available to the host node via an internal data bus in accordance with a standard I/O bus protocol.

Conversely, data for transmission can be communicated by the host node via the bus to device interface 312. In at least some embodiments, the device interface 312 packetizes the data with appropriate headers and end-of-frame markers, optionally adding a layer of error correction coding and/or a checksum. Driver 314 accepts an input data stream from interface 312, and converts the digital data into an analog electrical drive signal for an emitter module 316. The emitter module 316 converts the electrical drive signal into an optical transmit signal that is coupled via splitter 304 to the optical fiber 302.

If the interface 312 delivers the input data stream in parallel, the driver 314 converts the parallel input data stream into a serialized transmit data stream. Otherwise the input data stream may itself serve as the transmit data stream. FIG. 4 is a schematic of an illustrative output stage for the driver 314. The illustrative output stage is designed to convert a binary transmit data stream, i.e., a transmit bit stream, into a differential electrical transmit signal. An inverter 402 operates on the transmit bit stream to produce a complementary bit stream. A synchronization latch 404 provides the transmit bit stream and the complementary bit stream to signal buffers 406, 408. Signal buffers 406, 408 drive the differential electrical transmit signal on the lines labeled OUT+, OUT−, which are the electrical leads for the emitter module 316.

FIG. 4 represents the internals of the emitter module 316 with an equivalent circuit having a capacitor 410 coupled to the electrical leads by series resistors 412, 414. FIG. 4 further shows supply voltage lead 416 and ground voltage lead 418 for the driver 314, between which the supply voltage is connected. A coupling capacitor 420 is typically coupled between these leads to reduce high-frequency noise in the power signal.

Figure 6A:
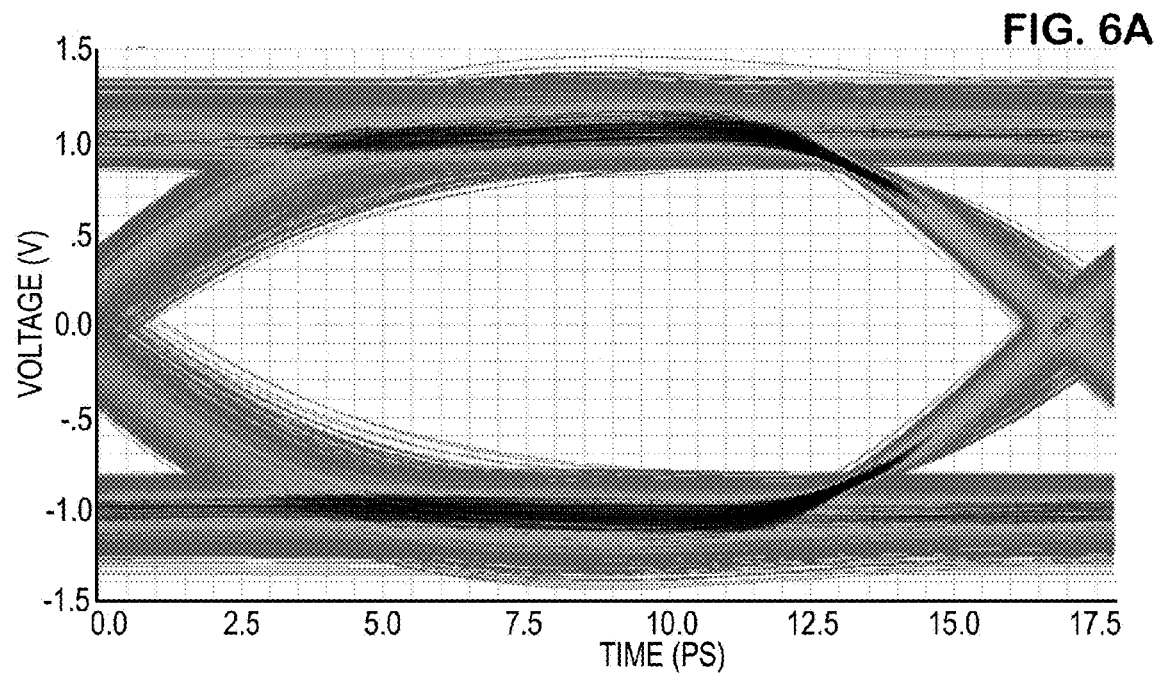
FIGS. 6A-6B are eye diagrams at the driver output before and after current leveling.

A typical capacitance value for decoupling capacitor 420 is 10 pF. Other illustrative values that may be employed for modeling the performance of driver 314 are nominal voltage differences between the OUT+ and OUT− lines of plus or minus 1 V, resistances of 1.25 ohms for each of the resistors 412, 414, and an capacitance value of 0.8 pF for capacitor 410. Importantly, the parasitic inductance on the integrated circuit package pins, including the voltage supply pins, should be taken into account. Inductor 422 represents the parasitic inductance that these pins present on the voltage supply lines. A value of 0.1 nH is believed to be a typical value. With these simulation values and a bit interval of approximately 18 ns, the eye diagram of the electrical transmit signal (shown in FIG. 6A) for a pseudo-random bit sequence is found to be undesirably fuzzy, yielding a less-than-optimal eye opening.

Further analysis reveals that the parasitic inductance (inductor 422) is a primary cause of the distortion. More specifically, whenever the bit sequence progresses from a dense concentration of bit transitions to a sparse concentration of bit transitions or vice versa, the current drawn from inductor 422 and decoupling capacitor 420 varies significantly. Moreover, the spectral content of this variation is not limited to the high frequencies that can be adequately suppressed by capacitor 420, forcing the current through the inductor 422 to vary. As inductors translate such current variation into voltage variation, the voltage between the supply voltage lead 416 and ground voltage lead 418 exhibits an undesirable degree of variation over the range from about 0.8 V to over 1.3 V, i.e., over 50% of the nominal Vcc value of 1 V.

Figure 5:
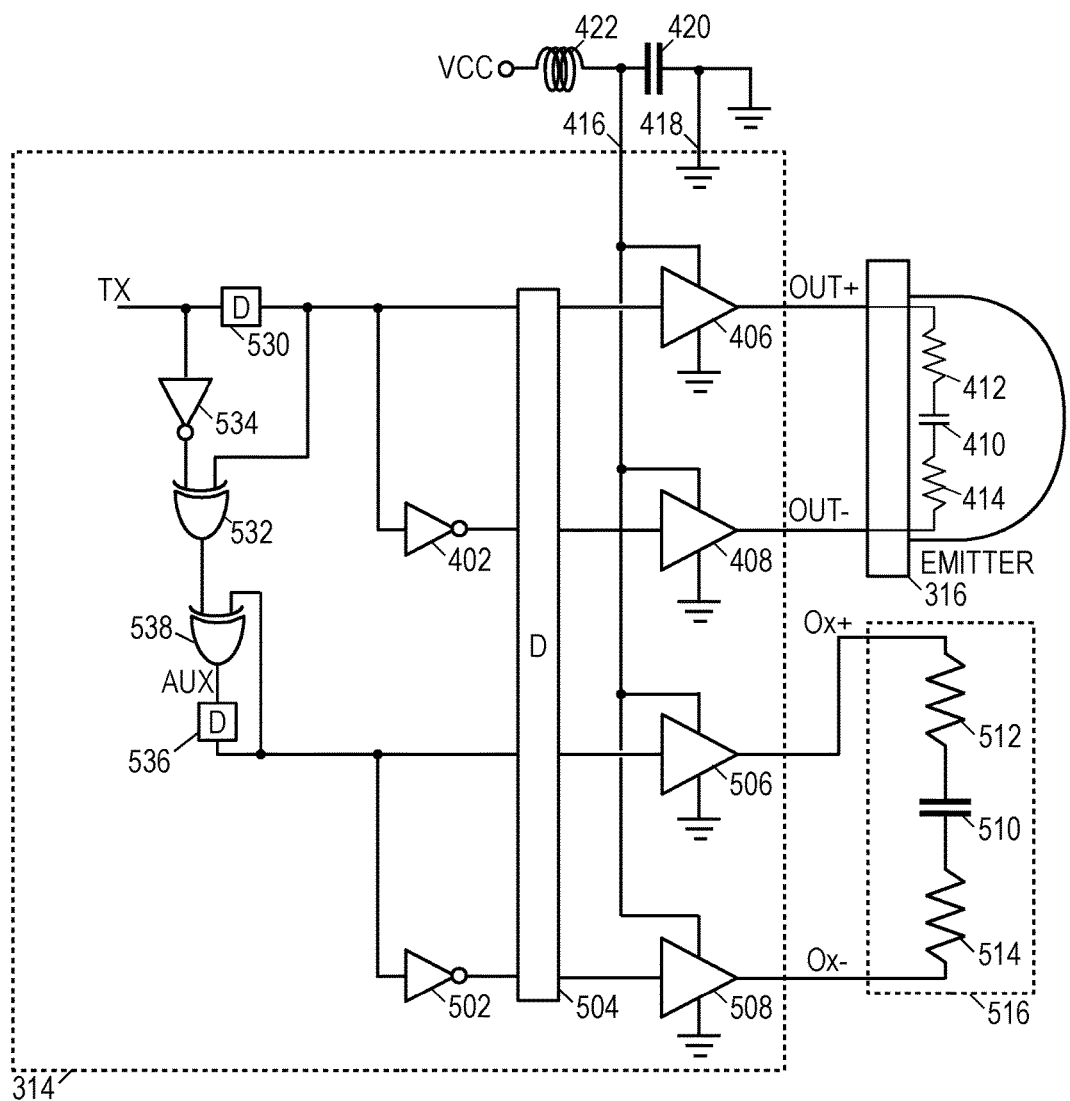
FIG. 5 is a schematic of an illustrative driver output stage with current leveling.

Accordingly, FIG. 5 adopts a current leveling strategy, augmenting the driver circuitry with auxiliary signal buffers to drive an electrical auxiliary signal having transitions where the electrical transmit signal lacks them. Components 402 and 406-422 are retained in the driver schematic of FIG. 5.

An inverter 502 operates on an auxiliary bit stream (generated as provided further below) to produce a complementary bit stream. Synchronization latch 404 has expanded to become synchronization latch 504, which synchronously provides the transmit bit stream and an auxiliary bit stream, together with their complements, to the signal buffers. The transmit bit stream is provided to signal buffer 406, the complementary transmit bit stream is provided to signal buffer 408, the auxiliary bit stream is provided to signal buffer 506, and the complementary auxiliary bit stream is provided to signal buffer 508.

As before, signal buffers 406, 408 drive a differential electrical transmit signal via lines OUT+, OUT− to the electrical leads of emitter module 316. However, signal buffers 506, 508 drive a differential electrical auxiliary signal via lines Ox+, Ox− to the electrical leads of an auxiliary module 516. The auxiliary module 516 has an input impedance that matches that of the emitter module 316, e.g., with a capacitor 510 and series resistors 512, 514 having values equal to those for the equivalent circuit of module 316. In some embodiments, the auxiliary module is integrated into the driver 312, i.e., located "on-chip". Alternatively, the auxiliary module 516 may be an emitter module, albeit one that is not coupled to an optical fiber.

The driver 312 of FIG. 5 derives the auxiliary bit stream AUX from the serialized transmit bit stream TX, but it is also possible to derive it from the parallel input bit stream. A delay element 530 buffers the transmit bit stream for one bit interval, and a logic XOR gate 532 compares the delayed bit with the current bit. Normally such a comparison would be indicative of a transition (i.e., gate 532 asserts its output when the inputs are mismatched), but one of its inputs is inverted by inverter 534. Consequently the output of gate 532 is asserted when the transmit bit stream lacks a transition between the delayed bit and the current bit. (In some alternative embodiments, the delayed bit is inverted instead of the current bit. In still other embodiments, only the output of the XOR gate 532 is inverted.)

In other words, components 530-532 form a non-transition detection circuit that signals when the transmit bit stream is missing a transition. A toggle circuit takes this signal as a toggle signal and uses it to generate an auxiliary bit stream AUX having transitions to replace those missing from the transmit bit stream TX. The toggle circuit includes a delay element 536 that buffers the auxiliary bit stream for one bit interval, and an XOR gate 538 that combines the delayed auxiliary signal bit with the toggle signal, producing an auxiliary bit stream that changes state when the toggle signal is asserted, i.e., when the transmit bit stream lacks a transition.

Figure 6B:
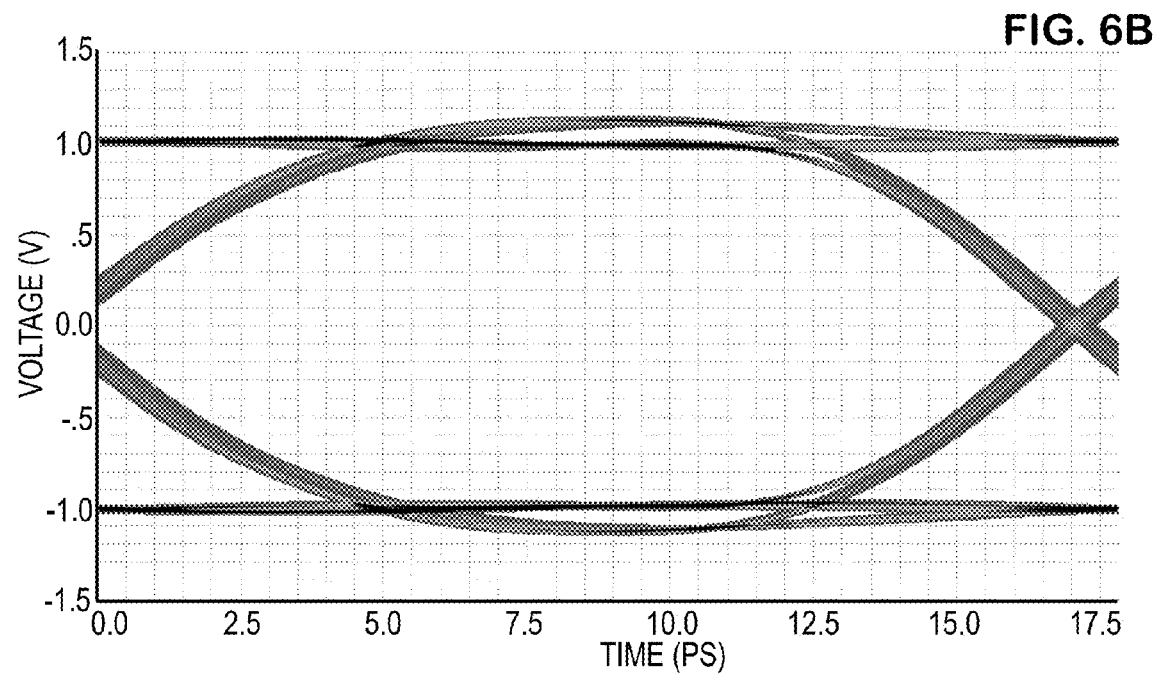

Thus, the transmit and auxiliary bit streams supplied by the synchronization latch 504 to the signal buffers 406, 408, 506, 508 have, when considered jointly, transitions occurring at a constant rate, causing the signal buffers to draw current from a shared voltage supply node (and hence through any series inductances such as the parasitic inductance represented by inductor 422) at a rate that is constant when considered on the bit interval time scale, essentially eliminating the voltage variation at the supply voltage leads 416, 418. Any higher-frequency components should be adequately suppressed by the decoupling transistor 420. When the performance of this driver is simulated using the simulation values given previously, the eye diagram of the electrical transmit signal (shown in FIG. 6B) for a pseudo-random bit sequence is found to be substantially superior to that of FIG. 6A.

Figure 7:
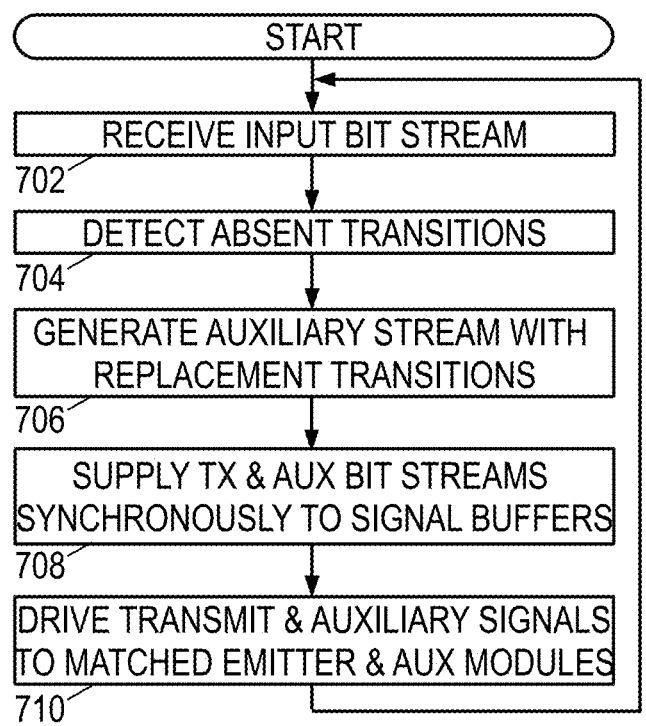
FIG. 7 is a flowchart of an illustrative current leveling method.

In view of the foregoing principles and techniques, FIG. 7 presents an illustrative current leveling method. In block 702 a driver for a light emitter module receives an input bit stream. If received over a parallel bus, the driver serializes the input bit stream to obtain a transmit bit stream. In block 704, the driver detects bit intervals where the transmit bit stream lacks a transition. In block 706, the driver generates an auxiliary bit stream having transitions at those bit intervals where the transmit bit stream lacks a transition. In block 708, the driver supplies the transmit and auxiliary bit streams synchronously to the signal buffers. In block 710, the signal buffers drive the leads to an emitter module and a matched auxiliary module with electrical transmit and electrical auxiliary signals, respectively.

Numerous modifications, equivalents, and alternatives will become apparent to those skilled in the art once the above disclosure is fully appreciated. For example, the driver may be coupled to a transducer other than an optical emitter, e.g., an extremely high frequency (EHF) electromagnetic wave transmitter or modulator. It is intended that the following claims be interpreted to embrace all such modifications, equivalents, and alternatives where applicable.

What is claimed is:

1. A high-speed transmitter that comprises:
   an emitter module that converts an electrical transmit signal into an optical transmit signal;
   an auxiliary circuit having an input impedance matched to an input impedance of the emitter module; and
   a driver that supplies the electrical transmit signal to the emitter module and an auxiliary signal to the auxiliary circuit, the auxiliary signal having a transition at every bit interval where the electrical transmit signal lacks a transition.

2. The transmitter of claim 1, wherein the driver derives the electrical transmit signal and the auxiliary signal from an input bit stream using at least a non-transition detection circuit.

3. The transmitter of claim 2, wherein the non-transition detection circuit is coupled to a toggle circuit that introduces transitions in the auxiliary signal.

4. The transmitter of claim 1, further comprising a latch that synchronizes bit intervals in the electrical transmit signal and the auxiliary signal.

5. The transmitter of claim 1, wherein the driver supplies the electrical transmit signal and the auxiliary signal using signal buffers that are powered from a shared voltage supply node having a series inductance.

6. The transmitter of claim 1, wherein the driver supplies the electrical transmit signal using a differential pair of transmit signal buffers and supplies the auxiliary signal using a differential pair of auxiliary signal buffers, each of said differential pairs being powered from a shared voltage supply node having a series inductance.

7. A driver for supplying an electrical transmit signal to a light emitter module in response to an input bit stream, the driver comprising:
   a voltage supply node;
   a transmit signal buffer that drives the electrical transmit signal with current from the voltage supply node, the electrical transmit signal including transitions at bit intervals as dictated by the input bit stream; and
   an auxiliary signal buffer that supplies an auxiliary signal with current from the voltage supply node to an auxiliary circuit having an input impedance matched to an input impedance of the emitter module, the auxiliary signal having a transition at every bit interval where the electrical transmit signal lacks a transition.

8. The driver of claim 7, further comprising a non-transition detection circuit that signals a lack of transition between bits in the input bit stream.

9. The driver of claim 8, further comprising a serialization circuit that derives a serialized transmit stream from the input bit stream, wherein the non-transition detection circuit operates on the serialized transmit stream.

10. The driver of claim 8, further comprising a toggle circuit coupled to the non-transition detection circuit to generate a serialized auxiliary stream having transitions at every bit interval where the serialized transmit stream lacks a transition.

11. The driver of claim 10, further comprising a synchronization latch that provides the serialized transmit stream to the transmit signal buffer synchronously with providing the serialized auxiliary stream to the auxiliary signal buffer.

12. The driver of claim 7, wherein the transmit signal buffer is part of a differential pair of transmit signal buffers and the auxiliary signal buffer is part of a differential pair of auxiliary signal buffers, each of said differential pairs drawing current from said voltage supply node.

13. A high-speed transmission method that comprises:
    deriving a serialized transmit stream from an input bit stream;
    deriving a serialized auxiliary stream from the input bit stream, the serialized auxiliary stream having a transition at every bit interval where the serialized transmit stream lacks a transition;
    synchronously supplying the serialized transmit stream to a transmit signal buffer and the serialized auxiliary stream to the auxiliary signal buffer;
    driving an emitter module with an electrical transmit signal from the transmit signal buffer; and
    driving an auxiliary circuit with an auxiliary signal from the auxiliary signal buffer, the auxiliary circuit having an input impedance matched to an input impedance of the emitter module.

14. The method of claim 13, further comprising:
    powering the transmit signal buffer and the auxiliary signal buffer from a shared voltage node having a series inductance.

15. The method of claim 13, wherein said deriving the serialized auxiliary stream includes:
    detecting non-transitions between bit intervals in the serialized transmit stream; and
    toggling the serialized auxiliary stream each time a non-transition is detected.

* * * * *